Aug. 10, 1954
G. A. LYON
2,686,082
WHEEL COVER
Filed July 25, 1950
2 Sheets-Sheet 1
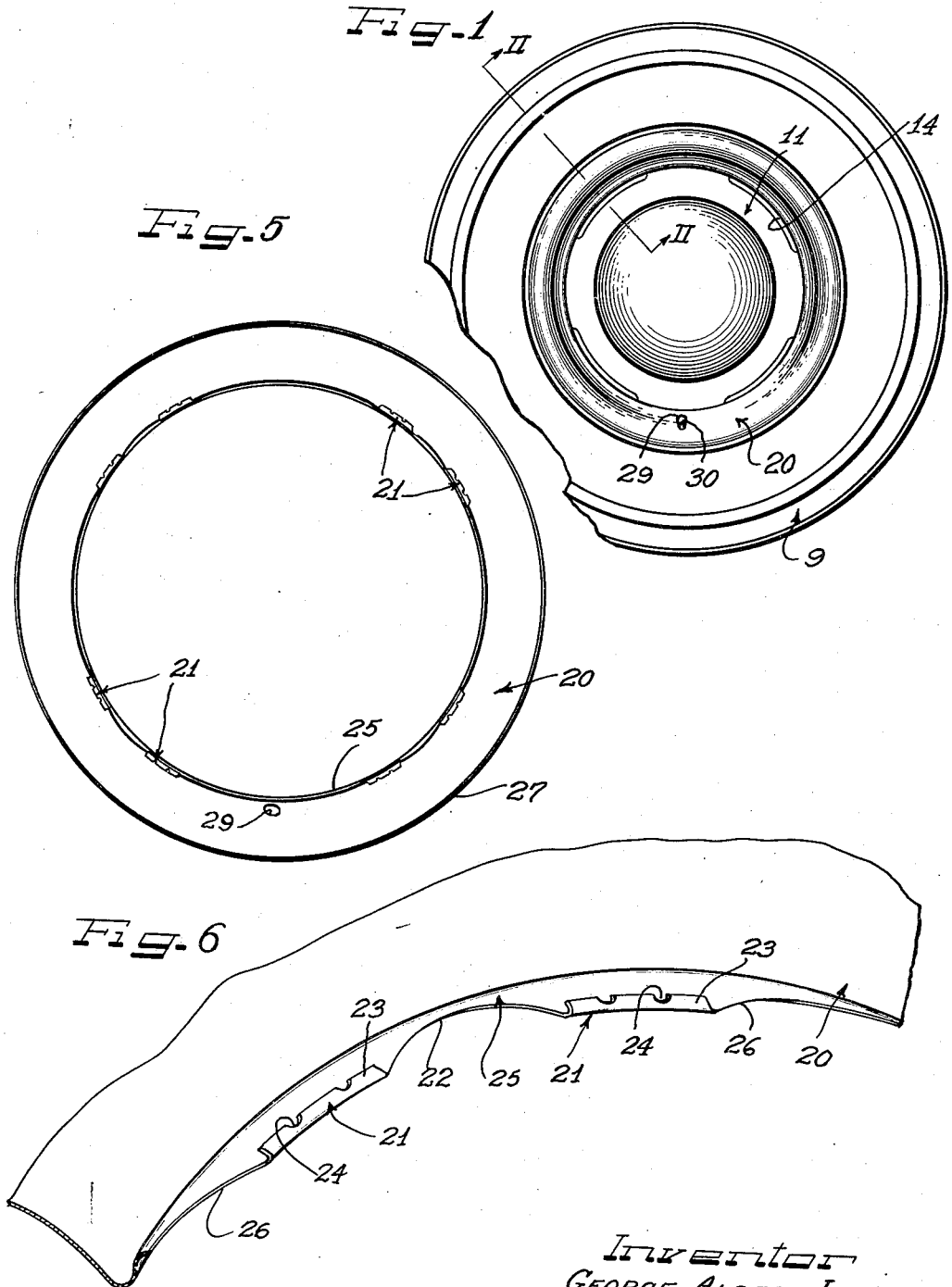
Inventor
GEORGE ALBERT LYON
by The firm of Charles A. Hill
Attys.

Aug. 10, 1954
G. A. LYON
WHEEL COVER
2,686,082
Filed July 25, 1950
2 Sheets-Sheet 2
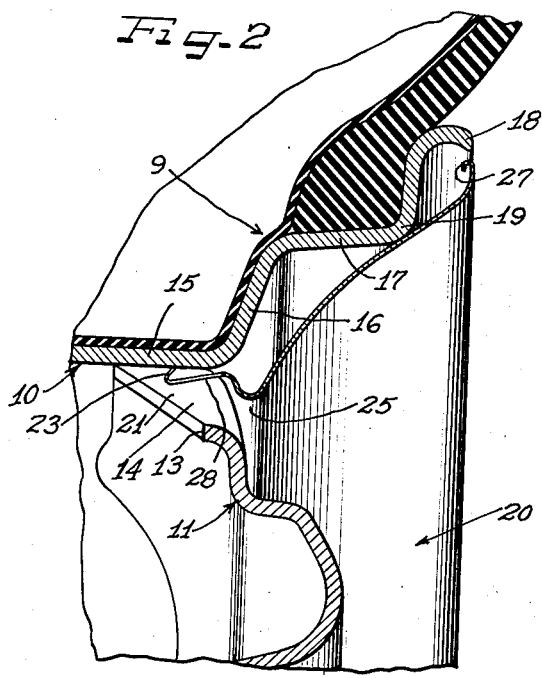
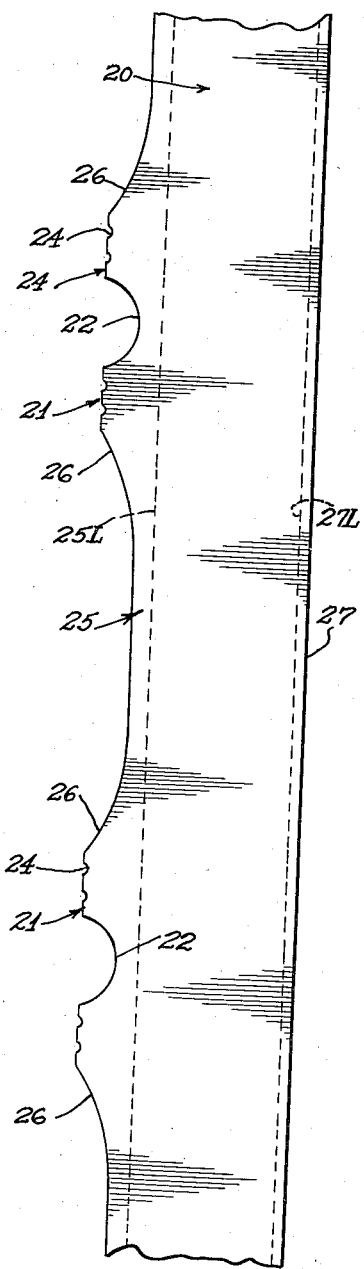
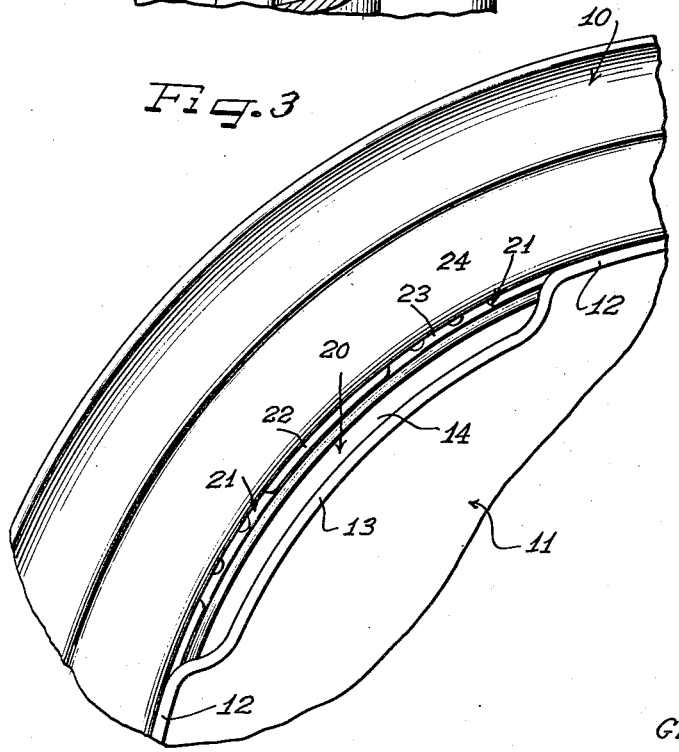
Inventor
GEORGE ALBERT LYON
by
Attys.

Patented Aug. 10, 1954

2,686,082

UNITED STATES PATENT OFFICE 2,686,082

WHEEL COVER

George Albert Lyon, Detroit, Mich.

Application July 25, 1950, Serial No. 175,769

4 Claims. (Cl. 301—37)

This invention relates to wheel structures and more particularly to an ornamental wheel trim for an automobile wheel.

An object of this invention is to provide a new way of fastening, in a simple manner, a wheel trim to an automobile wheel.

Another object of this invention is to provide an improved and simple one-piece wheel trim ring which includes in itself resilient retaining fingers for attaching it to a wheel in the openings of a wheel.

Yet another object of the invention relates to the provision of improved resilient wheel gripping fingers on the internal margin of an annular trim ring.

In accordance with the general features of this invention there is provided a wheel trim ring comprising an annulus of generally dished cross-section and having an underturned peripheral margin formed into a continuous annular spring flange, spaced portions of which are formed into resiliently yieldable finger extensions arcuately curved about the axis of the ring and which extensions have relatively rigid extremities turned radially outward over the extensions; each extremity being of shallow depth and being inclined radially and outwardly for wheel gripping engagement under the resilient tension of its corresponding extension.

Another feature of the invention relates to the forming of the above described trim ring and finger extensions all out of a single strip of springy sheet metal, such as stainless steel, the ends of which strip are welded together to make the ring.

Yet another feature of the invention relates to the forming of the aforesaid trim ring so that when it is used in a wheel structure or assembly the fingers will fit into the wheel openings in the body of the wheel and at the base of the tire rim.

Another and further feature of the invention relates to the forming of an intermediate portion of the ring so that it will bottom on a flange of the tire rim when the ring is pressed home on the wheel to limit the extent to which the finger extensions project into the wheel openings.

Other objects and features of this invention will more fully appear from the following detailed description taken in connection with the accompanying drawing which illustrates a single embodiment thereof and in which Figure 1 is a fragmentary side view of a wheel structure having my novel trim ring applied thereto;

Figure 2 is an enlarged fragmentary cross-sectional view taken on substantially the line II—II of Figure 1 looking in the direction indicated by the arrows;

Figure 3 is a rear view of the structure shown in Figure 2 showing how the finger extensions on the trim ring project into the wheel opening;

Figure 4 is a fragmentary view of a portion of the ring laid out flat prior to its being transversely rolled into shape;

Figure 5 is a rear view of my novel trim ring showing the spacing between the fingers; and Figure 6 is a fragmentary perspective view showing one set of finger extensions from the rear side of the ring and which set is cooperable with the base of the rim flange in the wheel openings.

As shown on the drawings:

The reference character 9 designates generally a conventional pneumatic automobile tire and tube assembly mounted in the usual way upon a conventional multi-flanged drop center type of tire rim 10.

In addition, the wheel includes a central body part 11 comprising a dished metallic stamping which is adapted to be attached by any suitable means such, for example, as wheel bolts or cap screws (not shown) to the brake assembly on an automobile axle. Peripheral portions are cut out at spaced intervals so as to provide an inturned flange or edge 13 which together with the base flange 15 define spaced wheel openings 14. These wheel openings may be of any suitable number such, for example, as 3 to 5, although I have shown 4 of them in this embodiment (Figure 1).

The tire rim part 10, in addition to the base flange 15, includes a generally radial flange 16, an axial flange 17, and a terminal flange 18. The axial flange at its junction with the terminal flange 18 has an annular shoulder 19.

Cooperable with this more or less conventional wheel is a wheel trim, designated generally by the reference character 20, which embodies the features of this invention. I propose, in attaching this trim to the wheel, to make use of the apertures afforded by the wheel openings located directly inwardly of the base flange 15.

In order to facilitate a description of this invention I have, in Figure 4, shown a portion of the trim ring in flat strip form prior to its margins being turned or rolled into their ultimate configurations. Referring to this figure, it will be perceived that one margin of the strip which corresponds with the radially inner margin of the ring, is provided with spaced sets of finger extensions 21—21; the number of these sets corresponding to the number of the wheel openings. Each set of fingers 21—21 has a recess or cut out 22 for enhancing the resiliency of the extensions.

As shown best in Figure 6, after these resilient extensions are formed into fingers, they each include a shallow depth relatively rigid edge portion 23 which is notched out at spaced intervals as indicated at 24 for enhancing the gripping quality of the edge.

The rigid edges or extremities 23, as best shown in Figure 2, extend radially and axially outwardly over the main body of the finger extensions 21. Further, as best shown in Figures 3 and 6, these extremities, as well as the extensions themselves, are arcuately curved about the axis of the wheel.

Referring once again to Figure 4, it will be observed that the finger extensions all comprise part of a single marginal flange 25 which, in the forming of the ring from the strip, are bent along a line generally designated by the dash line 25L in Figure 4. This flange is cut away between the sets of fingers and the cut edges taper, as indicated at 26, toward each other.

The other margin of the strip is formed into a turned edge 27 (Figure 2) which is bent along the line designated generally by the dash line 27L in Figure 4.

In actual practice, I form the trim ring 20 from a strip of resilient sheet material such, for example, as stainless steel. Any suitable rolling equipment may be employed for rolling the strip into the cross-sectional shape shown in Figure 2 from which it is clear that the ring is generally curved in convex concave manner between its marginal turned edges.

In order to adapt the trim ring to the wheel, I find it desirable to provide it with a valve stem hole 29 (Figure 1) through which the end of the valve stem 30 of the tire and tube assembly can project so as to be accessible from the exterior of the ring.

In the application of my novel trim ring to the wheel, the hole 29 is first brought into register with the stem 30 and then the ring is pressed axially toward the wheel which causes the sets of finger extensions 21—21 to enter into the wheel openings 14 (Figure 3) with the edges 23 of the extensions cammingly engaging the inner surface of the rim base flange 15. These edges 13 are normally arranged in a common circle of a slightly greater diameter than that of the inner surface of the base flange 15 so that the extensions must be resiliently deflected by the base flange as they pass into the wheel openings. This resiliency is provided in the turned inner flange 25 of the ring which is a continuous flange. Actually, the short edges or terminal portions 23 of the finger extensions are relatively rigid but the extensions themselves are resilient and yield as the rigid edges are cammed inwardly upon contact with the base flange 15. This results in the terminal edges 23 tightly gripping the base flange 15 under resilient tension inside of the wheel openings.

Inward axial movement of the trim ring on the wheel is limited by the trim ring contacting the shoulder 19 of the tire rim at which time the outer turned edge 27 of the ring is disposed just inside of the terminal rim flange 18.

By reason of the fact that I make use of the wheel openings for accommodating the finger extensions, I find that I am enabled to bring the inner margin of the trim ring further into the body of the wheel, or in other words, closer to the medial plane of the wheel. This construction permits of a greater depth of dished ring and adds to the extent of the ornamental surface that is available for visual observation. Hence, when the external surface of the ring is given a high lustrous finish, the ring on the wheel provides a relatively great expanse of lustrous metal extending clear to the body part 11 at its junction with the rim 10. On the other hand, when it is desired to remove the ring removal may be easily effected by inserting the blunt end of a screw driver or pry-off tool under the turned inner margin 25 and forcibly prying the finger extensions free of their gripping contact with the base flange 15. Only a slight twisting movement of the screw driver is necessary to effect such removal of the trim ring.

However, when the trim ring is on the wheel, the resilient characteristics of the extensions comprising integral components of the single continuous marginal flange 25 are such that the trim ring is tightly held against accidental displacement from the wheel.

It will be understood that modifications and variations may be effected without departing from the scope of the novel concepts of the present invention.

I claim as my invention:

1. In a wheel structure including a multi-flanged tire rim and a supporting wheel body therefor connected at circumferentially spaced points to a base flange of the wheel rim leaving wheel openings alternating with said points at the base flange of the rim, a wheel trim therefor comprising an annulus of generally dished cross-section having an inner peripheral generally axially inwardly directed margin recessed at spaced portions to provide retaining fingers alternating with the recesses, each finger including a generally axially extending resilient portion formed to extend into the wheel opening and terminating in a radially outwardly turned retaining edge terminal portion of relatively shallow depth and substantial rigidity and inclined at an acute angle from said axial portion for contact with said base flange, each of said finger terminal portions being substantially shorter than the depth of the wheel openings and yieldably movable with its axially extending portion against the resilient tension of said axially extending portion upon the retaining edge thereof gripping the base flange within the wheel opening.

2. In a wheel structure including a multi-flanged tire rim and a supporting wheel body therefor connected at circumferentially spaced points to a base flange of the tire rim and inset intermediate said points to afford wheel openings, a trim ring for substantially covering the tire rim and having its inner margin located opposite the wheel openings, said inner margin comprising an underturned generally radially outwardly and axially inwardly extending flange having generally axially and radially inwardly extending retaining finger extensions within said wheel openings, said finger extensions having shallow retaining terminal flanges directed angularly generally radially and axially outwardly into retaining engagement under resilient tension of the finger extensions with the base flange of the tire rim, said terminal flanges being substantially shallower than the radial dimension of said openings so that the finger extensions can flex freely within said openings in the application of the trim ring to the wheel and also in prying the trim ring from the wheel.

3. In a wheel structure including a multi-flanged tire rim and a supporting wheel body therefor connected at circumferentially spaced points to a base flange of the tire rim and inset intermediate said points to afford wheel openings, a trim ring for substantially covering the tire rim and having its inner margin located opposite the wheel openings, said inner margin comprising an underturned generally radially outwardly and axially inwardly extending flange having generally axially and radially inwardly extending retaining finger extensions within said wheel openings, said finger extensions having shallow retaining terminal flanges directed angularly generally radially and axially outwardly into retaining engagement under resilient tension of the finger extensions with the base flange of the tire rim, said terminal flanges being substantially shallower than the radial dimension of said openings so that the finger extensions can flex freely within said openings in the application of the trim ring to the wheel and also in prying the trim ring from the wheel, each of said fingers being of substantial width and having the sides thereof tapered toward juncture with the underturned flange and being transversely curved following the curvature of the tire rim whereby to enhance the resilience of the fingers.

4. In a wheel structure including a multi-flanged tire rim and a supporting wheel body therefor connected at circumferentially spaced points to a base flange of the tire rim and inset intermediate said points to afford wheel openings, a trim ring for substantially covering the tire rim and having its inner margin located opposite the juncture of the tire rim and wheel body and overlying a small portion of the wheel openings adjacent to the tire rim, said inner margin comprising a generally axially inwardly extending flange having generally axially inwardly extending retaining finger extensions of a length to extend into said wheel openings adjacent to the tire rim and substantially concealed behind the inner margin of the trim ring, said finger extensions having short retaining terminal flanges directed angularly generally radially and axially outwardly for gripping retaining engagement under resilient tension of the finger extensions with the base flange of the tire rim, said terminal flanges being substantially shorter than the radical depth of said openings so that the finger extensions can flex freely radially within said openings in the application of the trim ring to the wheel and also in prying the trim ring from the wheel.

References Cited in the file of this patent

UNITED STATES PATENTS

| Number | Name | Date |
|---|---|---|
| Re. 22,410 | Lyon | Dec. 21, 1943 |
| 2,316,346 | Lyon | Dec. 21, 1943 |
| 2,368,228 | Lyon | Jan. 30, 1945 |